United States Patent Office 3,804,957
Patented Apr. 16, 1974

3,804,957
METHOD FOR PRODUCING MAYONNAISE
Edward Robert Purves, Forest Park, Ohio, assignor to
The Procter & Gamble Company, Cincinnati, Ohio
Filed Feb. 10, 1972, Ser. No. 225,132
Int. Cl. A23l 1/24
U.S. Cl. 426—363
15 Claims

ABSTRACT OF THE DISCLOSURE

A method of producing a highly stable, nonpourable mayonnaise or mayonnaise-like salad dressing with or without premixing, which comprises simultaneously introducing vegetable oil, water, an egg yolk containing ingredient, and acid into a single mixing chamber, mixing the ingredients by means of a high speed impeller to impart high shear forces and to provide a stable emulsion, and continuously removing the finished product from the mixing zone.

BACKGROUND OF THE INVENTION

This invention relates to a method for producing mayonnaise and mayonnaise-like salad dressings. Mayonnaise is a viscous, nonpourable food dressing. More specifically, it is an oil-and-water emulsion which utilizes egg yolk as the primary emulsifier. Due to the very high level of oil in mayonnaise, several problems are faced in its formulation, particularly in regard to the physical stability of the emulsion.

In the production of mayonnaise and mayonnaise-like salad dressings, the usual required ingredients are assembled and premixed in a container commonly referred to as a premixer. Premixing is generally used because of the unstable nature of these emulsions. Premixing allows slow and careful preparation of the mayonnaise emulsions. The ingredients for mayonnaise usually consist of egg yolk, oil, acid, and water. Spices, sugar, and salt are also frequently included. The resulting mixture of the required ingredients is transferred from the premixer through a mixture conduit at a substantially constant rate in a flowing stream to an emulsifying apparatus such as a colloid mill or the like. The emulsion is subjected to high shear forces, finely subdividing it and improving its storage stability. Initially, the mixture of ingredients consists of large globules of oil in water and is in liquid form. It is theorized that high shear mixing finely subdivides the oil particles and causes the emulsion to become highly viscous. High viscosity is a desired quality in these products because it produces a high level of stability. An inert gas such as nitrogen or carbon dioxide may be introduced into the mixture in the flowing stream path in the mixture conduit, whereby the combined mixture and gas are treated in the emulsifier apparatus to complete the emulsion. The emulsion is then transferred to a container or hopper of a jar filling machine or the like.

Almost all mayonnaise made commercially is made in colloid mills or similar high shear devices. The devices impart high shear forces to the mayonnaise ingredients by forcing them through small openings at high speed. Such methods produce highly stable mayonnaise, but minor fluctuations in the feed rates or compositions of the ingredients, or excessive mixing will cause the emulsion to break. The result is a messy, totally unusable mixture. The emulsifying apparatus has to be cleaned out, either by shutting down and taking it apart or by flushing it out with fresh ingredients.

The above-described problem does not occur when mayonnaise is made with a home-style mixer. However, such an operation is a batch process and the mayonnaise will not be storage stable because the low speed (low shear) mixer cannot subdivide the emulsion as finely as the mixer of the present invention. Therefore, home-made mayonnaise is not stable enough to be stored for long periods of time or shipped over long distances.

The prior art contains many disclosures of so-called continuous mayonnaise processes. Most of these processes involve the use of a premixing step in which some of the ingredients are mixed together before being added to the main mixing chamber with the remaining ingredients. Thus, these processes are not truly continuous, as is the continuous process of the present invention. U.S. Pats. 2,000,646, T. M. Rector, Method of Preparing Food Products, patented May 7, 1935, and 2,033,413, C. F. Chapman, Emulsifying Method, patented Mar. 10, 1936, describe continuous processes for making mayonnaise. These processes involve adding a part of the mayonnaise ingredients together at one end of a chamber, mixing these ingredients and passing them toward the opposite end of the chamber, and adding the remaining ingredients as the initial mixture is passed from one end of the chamber to the other. Thus, all of the ingredients are not mixed together simultaneously as in the applicant's continuous process. These processes do not provide the advantage of being able to withstand minor fluctuations in the feed rates.

It is an object of this invention to provide a process for producing mayonnaise and mayonnaise-like salad dressings which provides the substantial advantage of being able to withstand minor fluctuations in the feed rates without breaking the emulsion.

Another of the objects of this invention is to provide a continuous method of producing mayonnaise and mayonnaise-like salad dressings which does not involve a premixing step.

Yet another object of the present invention is to provide a continuous method for producing mayonnaise and mayonnaise-like salad dressings in which all of the ingredients are introduced and mixed together simultaneously.

SUMMARY OF THE INVENTION

The present invention relates to a method by which mayonnaise and mayonnaise-like salad dressings can be continuously or semicontinuously produced. The continuous method comprises mixing all of the mayonnaise or mayonnaise-like salad dressing ingredients together simultaneously in a single mixing chamber and then imparting high shear forces to the ingredients by means of a high speed impeller which is small in comparison to the diameter of the mixing chamber, or by other suitable means. The semicontinuous method comprises premixing the ingredients and then passing them through the above-described high shear mixing chamber. A desirable, highly viscous, and highly stable mayonnaise product is produced by both processes.

DETAILED DESCRIPTION OF THE INVENTION

Figure 1:
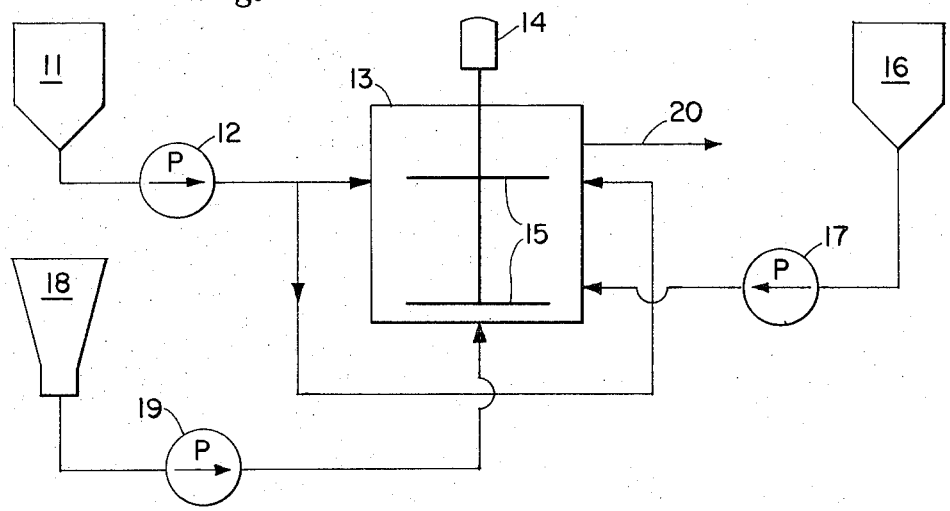
FIG. 1 is a diagram of the continuous method of this invention.

Mayonnaise is the emulsified semisolid, nonpourable food dressing prepared from vegetable oil, water, an egg yolk-containing material, and an acidifying ingredient. It contains from about 65% to about 90% vegetable oil (65% is the lower limit allowed by the Food and Drug Administration Standards of Identity, but as little as 50% would be functional), from about 5% to about 15% water, from about 1% to about 10% egg yolk, and from about 0.1% to about 1% acid. Common additional ingredients in mayonnaise include salt, sugar, spices, e.g., mustard flour, and flavoring additives.

The vegetable oil used in mayonnaise can be any edible vegetable oil and is preferably a salad oil. Corn, sunflower, soybean, and cottonseed oils are preferred. Refined and lightly hydrogenated soybean and/or cottonseed oils are highly preferred. The oil can be winterized and a crystal inhibitor, e.g. oxystearin, can be included. It is preferred that the vegetable oil comprise 75% to 85% of the mayonnaise ingredients and that water comprise 6% to 12% of the mayonnaise ingredients.

The egg yolk ingredient in mayonnaise can be in the form of liquid egg yolks, frozen egg yolks, rehydrated dried egg yolks, liquid whole eggs, frozen whole eggs, rehydrated dried whole eggs, or any of the foregoing combined with liquid egg whites or frozen egg whites. A sufficient amount of egg yolk-containing ingredient should be used to provide from about 1% to about 10% egg yolk in the mayonnaise. It is preferred that the amount of egg yolk be from 2% to 7% of the mayonnaise ingredients.

The acid ingredient can be any edible acid. Preferably, it is acetic, citric, or a mixture of these acids. Acetic acid, e.g., in the form of vinegar, or citric acid, e.g. in the form of lemon or lime juice, are highly preferred. The acid source such as vinegar should be used in sufficient amount to provide from about 0.1% to about 1% actual acid in the mayonnaise. It is preferred that the amount of acid be from 0.2% to 0.6% of the mayonnaise ingredients.

Additional ingredients in the mayonnaise can comprise: salt (preferably from about 0.5% to about 3%), e.g. sodium chloride; sugar (preferably from about 1% to about 4%), e.g. sucrose, dextrose, corn syrup, invert syrup, maltose, or honey; mustard (preferably from about 0.1% to about 2%), e.g. mustard flour; and additional spices, flavorings, or preservatives, e.g. paprika, monosodium glutamate, or ethylene-diamine-tetraacetic acid.

The mayonnaise-like salad dressings of the present invention must contain at least 30% vegetable oil to satisfy the Food and Drug Administration Standards of Identity, but lower amounts of vegetable oil are functional in the present invention. The preferred range for the use of vegetable oil is from 30% to 50% by weight of the total ingredients. The salad dressings must contain at least 4% egg yolk. This lower limit is also imposed by the Food and Drug Administration Standards of Identity. The salad dressings contain from about 2% to about 6% of a food starch such as tapioca flour, corn flour, and waxy maize starch. The salad dressings also must contain from about 0.5% to about 2% acid, preferably about 1%, and from about 25% to about 45% water, preferably from 30% to 40%. Additional ingredients similar to those stated above for mayonnaise can be added to the salad dressings, except that if sugar is used it should be added in the range of from 5% to 15%.

The salad dressings of the present invention are made in the same manner as mayonnaise is made, except that the food starch must be cooked before it can be used to make the salad dressings. Preferably, the food starch is combined with acid, water, and any desired additional ingredients, cooked at 180° F. to 190° F. for 10 to 20 minutes with continuous mixing, and then cooled. This cooked mixture is then combined with the other ingredients in accordance with the following description of the two processes of this invention.

In accordance with the continuous process of the present invention which is preferably carried out under an inert gas atmosphere such as nitrogen, all of the ingredients continuously and simultaneously flow into the mixing chamber. The mixing chamber can be any desired shape. The ingredients can flow in individually or certain of them can be combined prior to flowing into the mixing chamber. It is preferred that the ingredients flow into the mixing chamber in three streams, i.e. a water and acid stream, an oil stream, and an egg yolk-containing stream.

Once in the mixing chamber, the ingredients are subjected to high speed mixing by any suitable means. This high speed mixing causes the ingredients to be subjected to high shear forces and produces a finely subdivided emulsion. The mayonnaise or salad dressing product is continuously removed from the mixing chamber.

It is preferred that impellers mounted on a shaft which is rotating at high speed be used to impart the high shear forces to the ingredients. High mixing speeds are necessary to impart the desired high shear forces to the ingredients. The tip speed, the speed at which the outer tip of the impeller is traveling, can range from 2000 feet/minute to 5000 feet/minute for mayonnaise, and from 1000 feet/minute to 3000 feet/minute for salad dressings. Lower speeds will not produce sufficient storage stability and higher speeds may break the emulsion. The number of shafts is generally one to three, depending upon the size of the mixing chamber. The number of impellers on each shaft can be varied from one to five, again depending upon the size of the mixing chamber. The diameter of the impellers is preferably from about ⅓ the diameter of the mixing chamber to about ⅔ of the diameter of the mixing chamber, although large impellers are functional in the present invention. The above diameter range allows maximum storage stability without breaking the emulsion.

A simplified drawing of the preferred embodiment of this continuous process is shown in FIG. 1. Vegetable oil is pumped from the oil tank 11 by pump 12 to the mixing chamber 13. Egg yolk-containing ingredients are pumped from chamber 18 through pump 19 to the mixing chamber 13. Water, acid, and any additional ingredients are pumped from tank 16 through pump 17 to the mixing chamber 13. In the case of salad dressings, tank 16 will also contain the cooked food starch. The impellers 15 are turned by the rotary means 14 and the product is continuously removed through line 20.

In accordance with the semicontinuous process of the present invention which is preferably carried out under inert gas atmosphere, the ingredients are premixed in any conventional manner prior to being pumped to the mixing chamber. Again, the mixing chamber can be any desired shape. The ingredients are pumped into the mixing chamber where they are subjected to the same high shear mixing conditions as in the above-described continuous process. The finished mayonnaise product is continuously removed from the mixing chamber.

Figure 2:
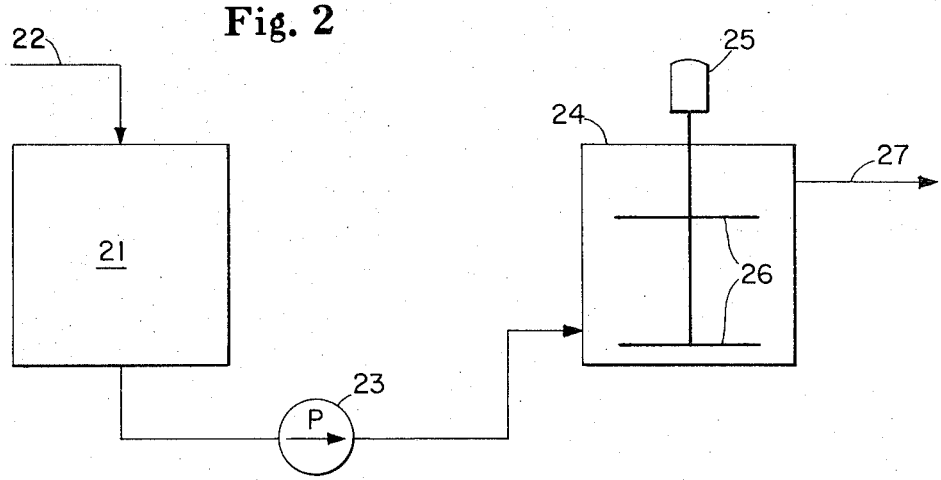
FIG. 2 is a diagram of the semicontinuous method of this invention.

FIG. 2 is a simplified diagram of the preferred semicontinuous process. The ingredients flow into the premix tank 21 through line 22 and are pumped through pump 23 into the mixing chamber 24. The rotary means 25 turns the impellers 26 and the product is continuously removed through line 27.

In the past, it was not possible to have a truly continuous mayonnaise process because the existing methods for imparting high shear forces to the ingredients could not tolerate fluctuations in the feed rates of the ingredients. Thus, when such fluctuations occurred, the mayonnaise would break and the mixing equipment would have to be cleaned out. The method of the present invention can be operated continuously because it does tolerate the inevitable minor fluctuations in the feed rates of the various ingredients which occur in continuous processes.

Such minor fluctuations can be tolerated because this type of mixing creates a large zone of finished product in the mixer. This is much different than in the colloid milling operation, where the high shear forces are imparted to a very small amount of the ingredients at any given time. Because of its size, the emulsion of the large mass of finished product will not break when the flow of one of the ingredients is altered or cut off. The mass can absorb the change in concentration without having the ratios of the ingredients changed to the point where the emulsion will break. A similar advantage is seen in the semi-continuous process of this invention. The instant type of mixing allows fluctuations in the flow from the premix tank to the mixer, whereas in other semi-continuous processes the emulsion would break if the flow from the premix tank was cut off. The large mass of finished product can absorb the extra work which is put into it by the mixer and not break, while the small amount of finished product that is present in the colloid mill operation cannot absorb the extra amount of work. The weight ratio of the mass of finished product in the mixing zone to the feed rate in pounds per minute of the ingredients can range from 0.2 to 4 (this is the residence time in minutes of the ingredients in the mixing zone). If the residence time is less than 0.2 minute, the emulsion will be too thin. If the residence time is more than 4 minutes, the emulsion will be too thin and it may break.

The following examples are meant only to illustrate the present invention and not to limit it in any way.

EXAMPLE I

The following experiment is carried out in an apparatus similar to the one described in FIG. 1. The ingredients are pumped into the mixer at the following rates: refined soybean oil with an iodine value of 110 at 7.8 pounds/minute; whole eggs (whole eggs are about 35% egg yolk) at 1.0 pound/minute; and a mixture of 21.6% vinegar (a 10% solution of acetic acid in water), 53.6% distilled water, 12.8% sucrose, and 12.0% salt at 1.2 pounds/minute. The residence time is 1.65 minutes. The mixer 13 comprises an 8-inch diameter bowl into which a shaft is inserted. The shaft contains two 4-inch diameter impellers 15 and is turned by a motor 14. In this experiment, the motor turns at about 3700 r.p.m. This motor speed corresponds to a tip speed of 3885 feet/minute. The emulsion does not break during this experiment.

The final mayonnaise product is taken off through line 20 at a rate of 10 pounds/minute. It has a composition of about 77% of the soybean oil, 10.5% whole eggs, 1.6% sucrose, 1.5% salt, 2.7% vinegar, and 6.7% distilled water. The mayonnaise emulsion is very finely divided and exhibits excellent storage stability.

EXAMPLE II

This experiment is carried out in an apparatus similar to that described in FIG. 2. The composition of the ingredients used in this experiment is the same as the composition in Example 1.

A small amount of finished product is placed in the premix tank 21. Egg yolks are then added and agitated for 2 to 3 minutes until the mixture is uniformly dispersed. The oil is then allowed to flow slowly into the premix tank at a rate of about ¼ of the total oil needed per minute. After all the oil is in the premix tank, the solution of vinegar, water, sucrose, and salt is slowly added to the premix tank.

The premixed ingredients are then pumped at 10 pounds/minute into the mixer 24 which is comprised of an 8-inch diameter bowl with a shaft extending down into it, said shaft having two 4-inch diameter impellers 26 on it. The residence time is 1.65 minutes. The tip speed is 3885 feet/minute, and the final product is taken off through line 27 at a rate of 10 pounds/minute without breaking the emulsion. The final mayonnaise product is very finely divided and exhibits excellent storage stability.

EXAMPLE III

A starch paste is made up by mixing the following ingredients together: 8.0% of a ⅓–⅓–⅓ blend of tapioca, corn, and waxy maize starches; 20.9% sucrose; 2.5% salt; 21.8% vinegar (a 10% solution of acetic acid in water); and 46.8% distilled water. The mixture is then cooked with continuous mixing at 185° F. for about 20 minutes.

The apparatus used in this experiment is similar to the one described in FIG. 1. Refined soybean oil with an iodine value of 110 flows into the mixer 13 at a rate of 8.5 pounds/minute. The above-described starch paste flows into the mixer at 9.0 pounds/minute. Egg yolks flow into the mixer at 1.5 pounds/minute. The residence time is 0.87 minute. The mixer is comprised of an 8-inch diameter mixing bowl with a shaft extending down into it. The shaft has two 4-inch diameter impellers 15 on it. The impellers are turned at a tip speed of 1575 feet/minute and the final product is withdrawn at a rate of 19 pounds/minute without breaking the emulsion.

The final salad dressing product has a composition of 44.7% soybean oil, 7.4% egg yolk, 3.8% starch, 10.0% sucrose, 1.3% salt, 10.4% vinegar, and 22.4% distilled water. The salad dressing product is a very finely dispersed emulsion which exhibits excellent storage stability.

I claim:

1. A method of continuously producing a highly stable, non-pourable food product selected from the group consisting of mayonnaise and mayonnaise-like salad dressings which involves no premixing step, said method comprising: simultaneously introducing the ingredients into a single mixing chamber; simultaneously mixing said ingredients so as to impart high shear forces to said ingredients and to provide a stable emulsion; and continuously removing finished product from the chamber; said high shear forces being imparted to said ingredients by impellers mounted on shafts which are turning at high speed, the number of shafts ranging from 1 to 3, the number of impellers per shaft ranging from 1 to 5, the impeller diameter ranging from ⅓ the diameter of the mixing chamber to ⅔ the diameter of the mixing chamber, and the tip speed of the impellers ranging from 1000 feet per minute to 5000 feet per minute.

2. The method of claim 1 wherein the residence time of the finished product in the mixing chamber ranges from 0.2 minute to 4 minutes.

3. The method of claim 2 wherein mayonnaise is produced and the ingredients comprise 65% to 90% vegetable oil, 5% to 15% water, 1% to 10% egg yolk, and 0.1% to 1% acid.

4. The method of claim 3 wherein the tip speed of the impellers ranges from 2000 feet per minute to 5000 feet per minute.

5. The method of claim 4 wherein the ingredients comprise from about 75% to about 85% vegetable oil, from about 6% to about 12% water, from about 2% to about 7% egg yolk, and from about 0.2% to about 0.6% acid.

6. The method of claim 5 wherein one shaft with two impellers is used and the impeller diameter is about ½ the diameter of the mixing chamber.

7. The method of claim 1 wherein a mayonnaise-like salad dressing is produced and the ingredients comprise at least 30% vegetable oil, 2% to 6% of a food starch, 0.5% to 2% acid, 25% to 45% water, and at least 4% egg yolks.

8. The method of claim 7 wherein the high shear forces are imparted to the ingredients by impellers on shafts which are turning at high speed; and the number of shafts ranges from 1 to 3, the number of impellers per shaft ranges from 1 to 5, the impeller diameter ranges from ⅓ the diameter of the mixing chamber to ⅔ the diameter of the mixing chamber, and the tip speed of the impellers ranges from 1000 feet per minute to 3000 per minute.

9. The method of claim 8 wherein the ingredients comprise 30% to 50% vegetable oil, 2% to 6% of a food starch, about 1% acid, 30% to 40% water, and at least 4% egg yolk.

10. The method of claim 9 wherein one shaft with two impellers is used and the impeller diameter is about ½ the diameter of the mixing chamber.

11. In a continuous method of producing a highly stable, non-pourable food product selected from the group consisting of mayonnaise and mayonnaise-like salad dressings which comprises premixing the ingredients and then imparting high shear forces to said ingredients to provide a stable emulsion, the improvement which comprises: imparting the high shear forces to said ingredients by placing them in a mixing chamber and mixing them with impellers mounted on shafts, wherein the number of shafts ranges from 1 to 3, the number of impellers per shaft ranges from 1 to 5 and the impeller diameter ranges from ⅓ the diameter of the mixing chamber to ⅔ the diameter of the mixing chamber, said impellers turning at tip speeds of from 1000 feet/minute to 5000 feet/minute.

12. The method of claim 11 wherein the ingredients comprise from about 75% to about 85% vegetable oil, from about 6% to about 12% water, from about 2% to about 7% egg yolk, and from about 0.2% to about 0.6% acid.

13. The method of claim 12 wherein one shaft with two impellers is used and the impeller diameter is about ½ the diameter of the mixing chamber.

14. The method of claim 11 wherein the ingredients comprise 30% to 50% vegetable oil, 2% to 6% of a food starch, about 1% acid, 30% to 40% water, and at least 4% egg yolk.

15. The method of claim 14 wherein one shaft with two impellers is used, and the impeller diameter is about ½ the diameter of the mixing chamber.

References Cited
UNITED STATES PATENTS

| | | | |
|---|---|---|---|
| 2,033,413 | 3/1936 | Chapman | 99—144 |
| 1,949,791 | 3/1934 | Epstein et al. | 99—144 |
| 3,542,565 | 11/1970 | Stauffer | 99—144 |
| 2,781,270 | 2/1957 | Crawford et al. | 99—144 |

A. LOUIS MONACELL, Primary Examiner

J. M. HUNTER, Assistant Examiner

U.S. Cl. X.R.

426—362, 519